No. 883,381.  
PATENTED MAR. 31, 1908.  
J. C. BELL.  
CHECK OR MONEY ORDER.  
APPLICATION FILED DEC. 24, 1907.

UNITED STATES PATENT OFFICE.

JOHN C. BELL, OF CLEVELAND, OHIO.

CHECK OR MONEY-ORDER.

No. 883,381.　　　　　Specification of Letters Patent.　　　Patented March 31, 1908

Application filed December 24, 1907. Serial No. 407,957.

*To all whom it may concern:*

Be it known that I, JOHN C. BELL, of Cleveland, in the county of Cuyahoga and State of Ohio, have invented certain new and useful Improvements in Checks or Money-Orders; and I do hereby declare the following to be a full, clear, and exact description of the invention, such as will enable others skilled in the art to which it appertains to make and use the same.

My invention relates to an improved check or money-order, adapted particularly for transmitting small amounts of money through the mails,—the object of my present invention being to provide a device which can be issued by the Post Office Department as a postal check or money order for small amounts of money and which can be sold to business men and which will enable them to transmit small remittances representing fractional parts of the total value of the check or order, at the same time maintaining the checks or orders thus transmitted and redeemable by the Post Office Department, of uniform size and affording memoranda for the sender which will indicate to him the value of that portion of the check or order which he has used.

With these objects in view, the invention consists in certain novel features and arrangements of a check or money order as hereinafter set forth and pointed out in the claims.

In the accompanying drawings, Figure 1 is a view of one face of the check or order, Fig. 2 is a view of the opposite side, and Fig. 3 is a view showing portions of both sides of the check.

A represents the check or order, each face of which is provided with two duplicate series, *a, b,* of value designations, spaced apart and between the two series of value designations, on each face of the check, a contract portion *c* is provided. Each contract portion is provided with a space *d* designated to receive the number of the order, and spaces *e, f,* designated to receive the stamps of the agencies issuing and paying the check or order. Each contract portion is also provided with spaces *g, h,* designated to receive the name and address of the party to whom the check or order is made payable and also a space *i* designated to constitute, when signed, a receipt for the money paid when the check or order is redeemed by an agent of the Post Office Department. Below the lower series of value designations on each face of the check or order, instructions regarding the manner of using the device can be printed. Above the upper series of value designations on each face of the check, spaces *j, k,* are provided and designated to receive the name of a party to whom a check has been made payable and also the number and date of said check. The upper series of value designations, together with the designated spaces *i* and *j* on each face of the check, constitute, stubs or memoranda for convenience of the user of the check or order.

The value designations on the face of the check shown in Fig. 1 count by 5's and the greatest value of the designations on this face of the check is 50 cents, and the sheet is severable on lines which separate said value designations. The matter on the other face of the sheet (Fig. 2) is arranged in reverse order to the arrangement of the matter on the face of the sheet shown in Fig. 1, and the value designations of each series on the obverse face of the sheet (Fig. 2) are arranged to count by 5's from 50 to 100, the greatest value of the designations on this face of the order, being one dollar.

The lower series of value designations on each face of the sheet is arranged approximately in the center of the sheet, the space below such lower series of value designations being blank except for the printed instructions which occupy very little space below said lower series of value designations. The lower value designations on one face of the sheet are exactly opposite the lower series of value designations on the other face, except that the largest value designation on one face of the sheet is repeated and made the first value designation on the other face. Thus the value designations on the face of the sheet shown in Fig. 2, begin with the same designation with which the value designations on the face of the sheet shown in Fig. 1 end. It will be observed that the 5 cent designation in Fig. 1 is exactly opposite the $1 designation in Fig. 2, and that the 50 cent designation in Fig. 2 is out of line with the 50 cent designation in Fig. 2.

The two faces of the order will be printed in different colors. This is important for the purpose of preventing the patching of an order so as to make it read for a greater amount than would be intended.

The checks or orders may be provided with value designations of greater or less value than those shown in the drawings.

Assuming that a customer has purchased from an agent of the Post Office Department, a money-order of the total value of one dollar, and that he desires to transmit 35 cents. He will write the name of the party to whom the remittance is to be made, in the spaces $g$ and $j$ and the address of such person will be written in the space. He will then sever the sheet on the line under the 35 cents designation of the upper series, and the stub thus severed will serve as a memorandum for the sender, indicating to him that a check or order for 35 cents has been transmitted to the person whose name appears on such stub. The user will then again sever the sheet under the 35 cents designation of the lower series. The order thus formed will have a value of the highest amount shown in the lower series of value designations as stated in the contract portion $c$. When the sheet was severed under the 35 cents designation of the lower series, the lower series of value designations on the obverse face of the sheet (Fig. 2) was severed on a line under the 65 cents value designation, and in accordance with the statement in the contract portion on this face of the sheet, the order will be payable by an agent of the Post Office Department for 65 cents. The user can therefore make another remittance, this time, for 65 cents, after having first severed the sheet under the 65 cents designation of the upper series and filled in the name of the party to whom this remittance is made, in the space $j$, thus forming a stub or memorandum for the user as before explained.

It will be observed that both the orders which have been transmitted and which will be redeemed by the Post Office Department are of substantially the same size. This will always be the case, no matter what fractional portions of the whole value of an order may be used, and this is a valuable feature of my invention. The fact that the user is always furnished with a memorandum of the amount which he has used, is also a valuable feature.

Having fully described my invention what I claim as new and desire to secure by Letters-Patent, is,—

1. A money order having two duplicate series of value designations on each face, the duplicate series of value designations on one face being different from those on the other face of the order, and the duplicate series of value designations on each face separated by a contract portion, one series of said value designations on one face being opposite one of the series of value designations on the other face with the series of value designations on one face beginning with the same number with which the series of value designations on the obverse face ends.

2. A money order having two duplicate series of value designations on each face, the duplicate series of value designations on one face being different from those on the other face of the order, and the duplicate series of value designations on each face separated by a contract portion, one series of said value designations on one face being opposite one of the series of value designations on the other face with the series of value designations on one face beginning with the same number with which the series of value designations on the obverse face ends, the matter on the respective faces of the order being printed in different colors.

In testimony whereof, I have signed this specification in the presence of two subscribing witnesses.

JOHN C. BELL.

Witnesses:
J. POTTER
C. L. ESHLEMAN.